UNITED STATES PATENT OFFICE.

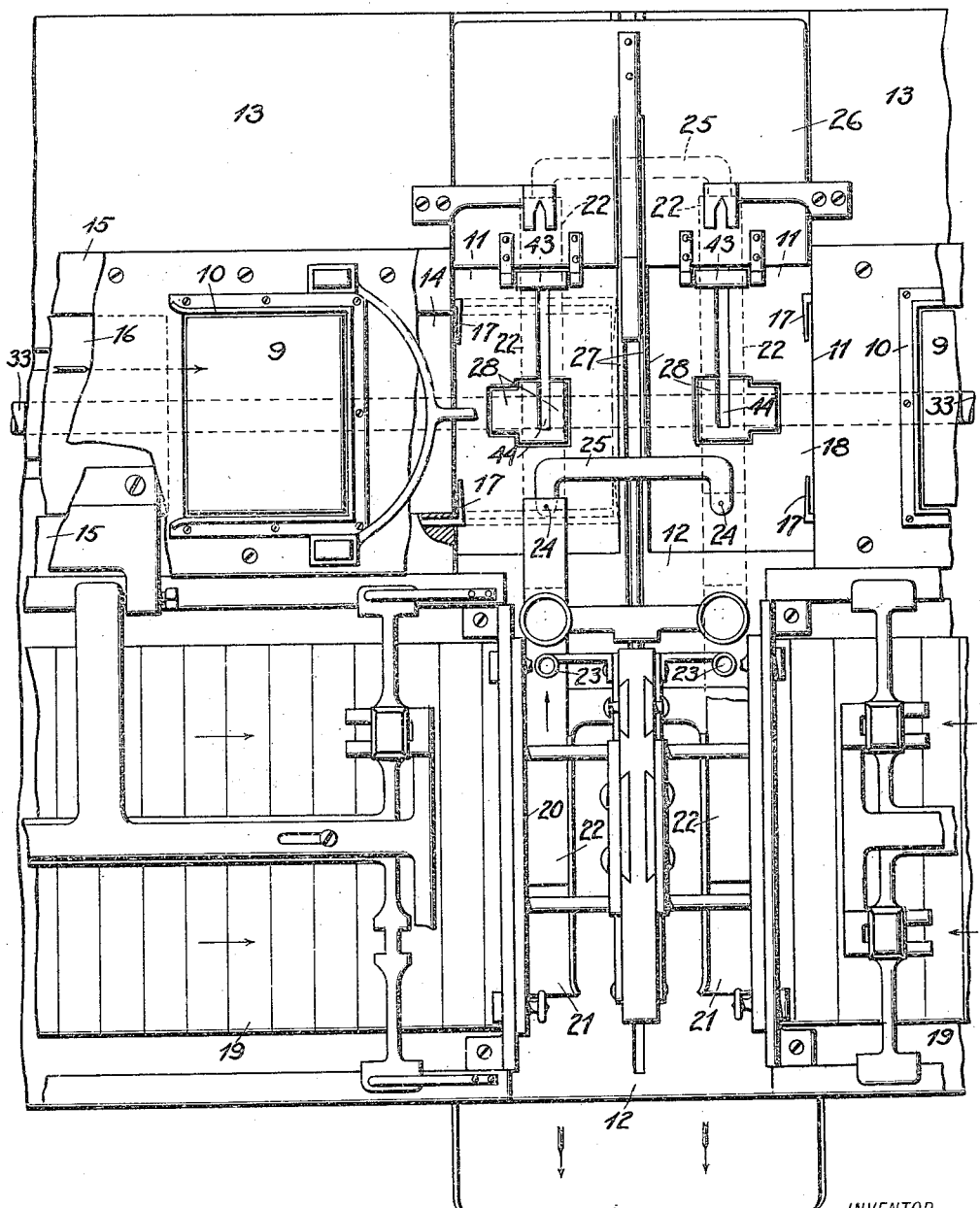

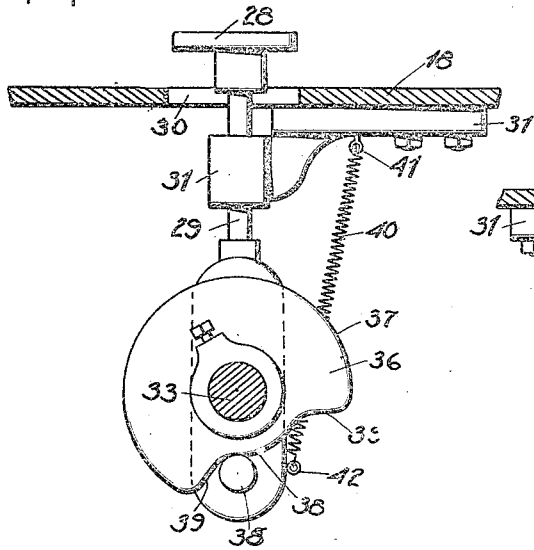
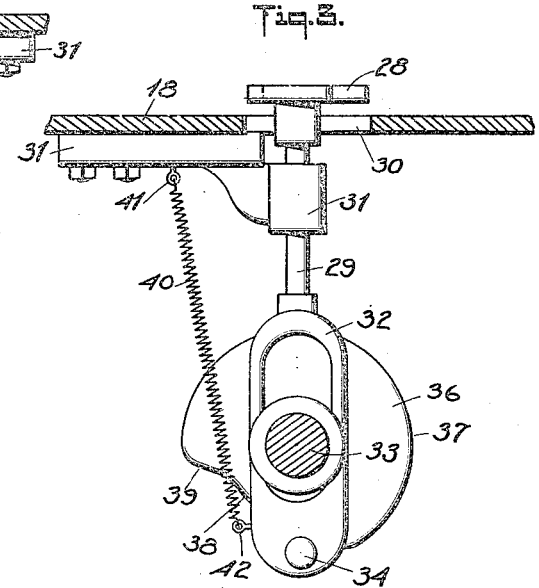
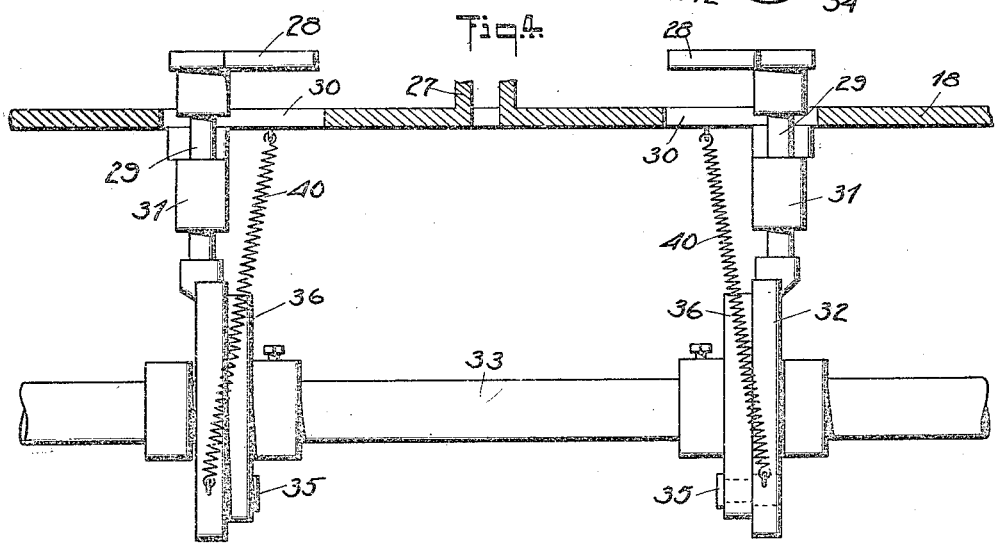

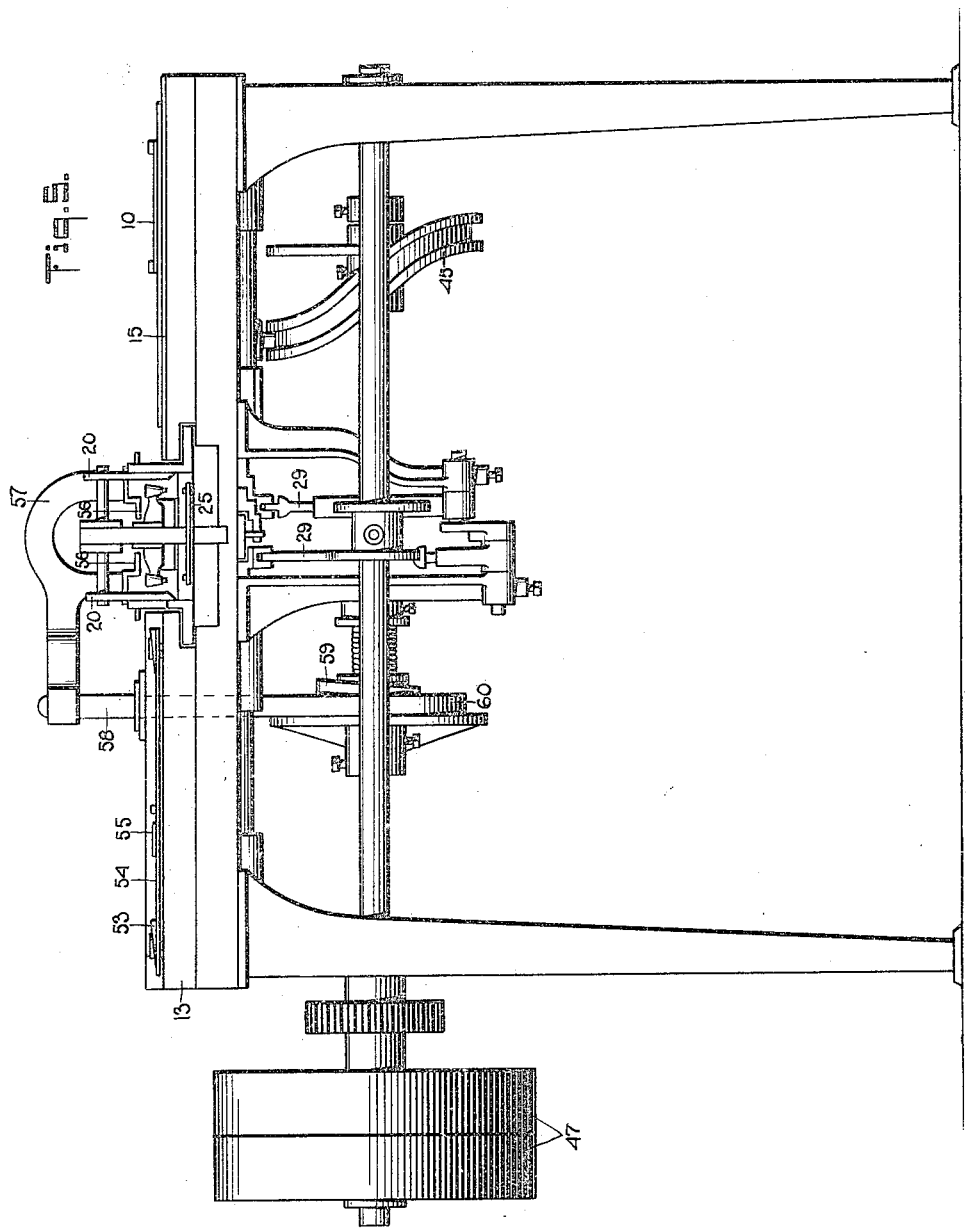

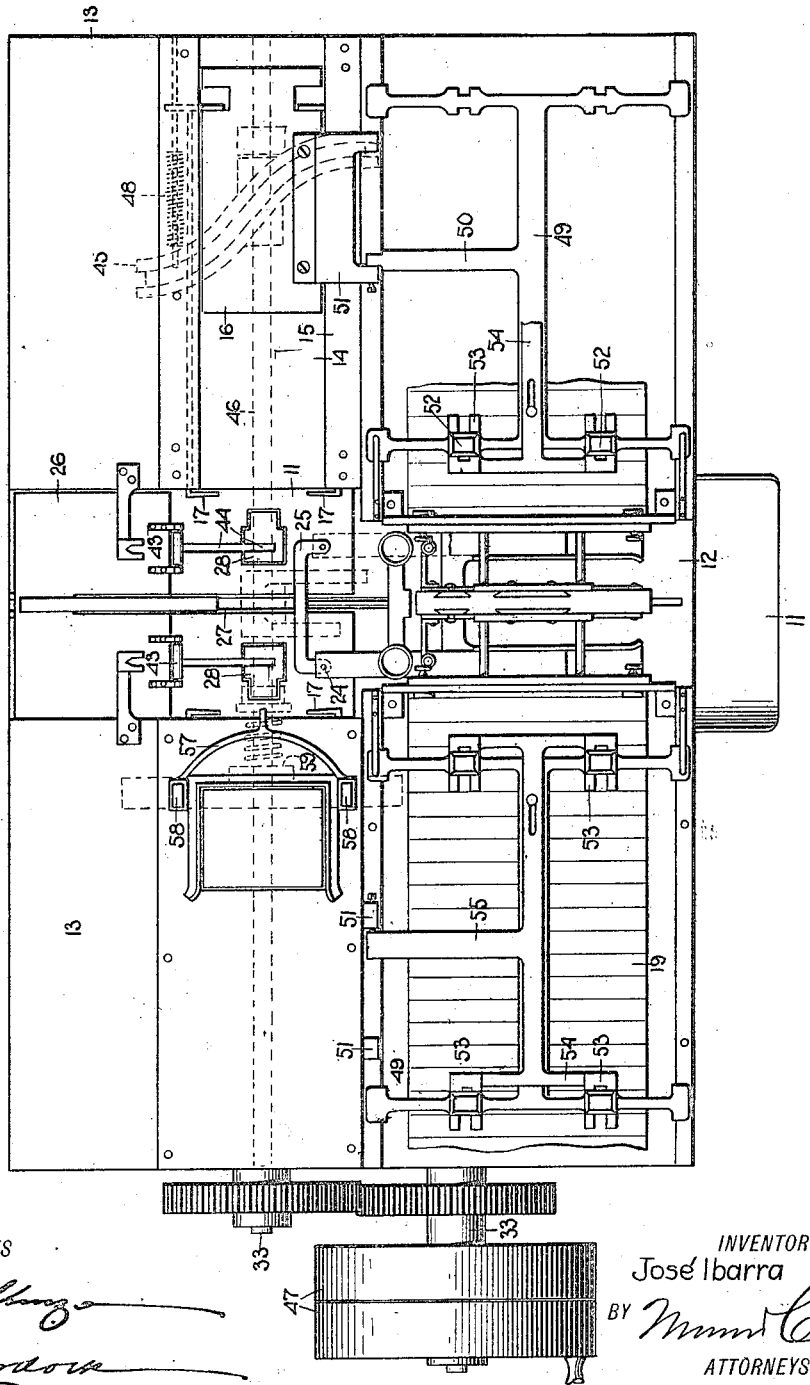

JOSÉ IBARRA, OF HABANA, CUBA.

STAMP-SUPPORTER FOR CIGARETTE-BOX-STAMP-APPLYING MACHINES.

1,137,625.  Specification of Letters Patent.  Patented Apr. 27, 1915.

Application filed September 23, 1914. Serial No. 863,085.

*To all whom it may concern:*

Be it known that I, José Ibarra, a citizen of Cuba, and a resident of Habana, Cuba, have invented a new and Improved Stamp-Supporter for Cigarette-Box-Stamp-Applying Machines, of which the following is a full, clear, and exact description.

The present invention is an improvement upon machines for cutting and pasting stamps on cigarette-boxes, for Letters Patent on which an application was filed by me under date of September 20, 1911, said application bearing Serial No. 650,399, and has for its objects to provide means for supporting the stamps in outstretched relation beneath one of the delivery positions of said box, where the same is placed to receive the stamps; and to provide means for preventing misregister of the stamps employed with the boxes to be supplied therewith.

*Drawings.*—Figure 1 is a plan view of a center portion of the above-mentioned machine for cutting and pasting stamps on cigarette boxes, having applied thereto supporting tables constructed and arranged in accordance with the present invention; Fig. 2 is a detail view, on an enlarged scale, showing in side elevation a stamp-supporter constructed and arranged in accordance with the present invention, said supporter being shown in fully-raised position; Fig. 3 is a similar view, taken from the opposite side of the supporter and showing the same in a lowered position; Fig. 4 is a detail view of two supporters positioned for operation substantially as shown in Fig. 1 of the drawings, said supporters being shown in elevated position corresponding to that shown in Fig. 2 of the drawings. Fig. 5 is a front elevation of a machine embodying the present invention; Fig. 6 is a plan view of the same.

*Description.*—As disclosed in the application for patent to which cross reference is above made, cigarette boxes 9 of conventional type are disposed in galleys 10 on opposite sides of the center of a delivery channel or runway 11 with which said machine is provided. The runway 11 is partially covered by a deck 12, which is flush with the upper surface of a table 13, and transversely disposed channels 14. The channels 14 are formed by rails 15, between which move plungers such as that indicated by the numeral 16 in Fig. 1 of the drawings. The cigarette boxes 9 are piled in the galleys 10, and rest normally on the floor of the runways or channels 14 in the path of the plungers 16. By means of a cam grooved wheel 45, driving shaft 46 and driven pulleys 47, shown best in Figs. 5 and 6 of the drawings, the plungers 16 are advanced under the galleys 10, carrying therefrom the lowermost of the boxes 9 to press against fingers 17. The fingers 17 are normally held in the position shown in Fig. 1 of the drawings, by suitable springs 48. The springs 48 referred to exert sufficient resistance to the movement of the boxes, or pressure upon said boxes, to sustain the weight of said boxes when in the operation of the machine the boxes are delivered outward above the floor of the runway 11. The floors of the runway 11 are indicated in Figs. 2 to 4 inclusive by the numerals 18. The floors 18 are disposed at a lower level than the channels 14 and below the under surface of the deck 12 to permit the free passage thereunder of the boxes 9.

The stamps to be applied to the boxes 9 are supplied in the form of sheets 19. The sheets 19 are delivered by a feeding mechanism, under reciprocating cutting blades 20, which successively sever the individual stamps from the sheets and deliver the same on tables 21. The forward end of each severed stamp 22 is held below cups 23. The cups 23 are vertically reciprocated to force the stamps down upon, to be punctured by, pins 24 at opposite ends of a drag bar 25.

The mechanism for advancing the sheets 19 embodies a skeleton frame 49 having extension arms 50 disposed in service for engagement by a bracket plate 51, between the extended and separated arms of which the ends of the arms 50 rest. The bracket plate 51 is mounted on and operated by the plungers 16. It is to advance the sheets 19 intermittently and when the frame 49 is moving in one direction only, that I have provided drags 52 which holdingly engage said sheets when permitted to rest thereon. The drags 52 are lifted and lowered by means of inclined wedges 53 carried by an auxiliary frame 54. The frame 54 has an arm 55, which normally rests above the arm 50 of the frame 49 and is engaged by extensions of the bracket 51. As seen best in Fig. 6 of the drawings, the arm 50 has a reduced end, the cut-away sides whereof permit the extensions of the bracket 51 to move the arm 55 and frame 54 connected therewith preliminary to shifting the frame 49. The lost motion thus provided permits the wedges 53 to elevate and lower the drags 52 at the beginning of the advancing and retracting operation of said sheets.

It is the function of the drag bar 25 and the operating mechanism therefor to remove the severed stamps 22 from the tables 21, and draw said stamps over the wells formed by the deck 12 on the one side, a reciprocating plate 26 on the opposite side, the edges of the channel 14, and rails 27.

In the operation of the plungers 16 and fingers 17, the boxes 9 are suspended above said wells and above the stamps 22. From the suspended positions thus provided for said boxes, they are moved by thrust members 56 operating from above the boxes to place the same on the floors of the runway 11, and upon the stamps 22 delivered in the path of said boxes.

The thrust members 56 are mounted at the lower ends of the yokes 57. The yokes 57 are mounted upon and extended from reciprocating plungers 58. The plungers 58 are reciprocated by means of an eccentric wheel 59, about which a collar 60 connected with said plungers, is passed.

To prevent sagging of the stamps, tables 28 are provided. As best seen in Figs. 2 to 4 inclusive, the tables 28 are mounted upon spindles 29, and normally rest in openings 30 provided in the floors 18 of the runways 11, the upper surfaces of said tables being flush with said floors when pocketed in said openings.

The spindles 29 are each mounted in bearings formed in brackets 31 suspended from the under side of the floor 18. At the lower end, each spindle is provided with a yoke 32, said yoke being adapted to enfold the driving shaft 33 of the machine, and to be guided thereby in the reciprocation of said spindle. At the lower end of each yoke 32 is provided a solid portion 34. Laterally extended from the portion 34 is a wearing pin 35, which bears upon the edge of one of the cam disks 36. Each cam disk 36 has a high level 37 and a low level 38, said levels being connected by rises 39. The levels 37 and 38 are relatively proportioned to the designed action of the tables 28.

Normally, the tables 28 and parts connected therewith are elevated by spiral springs 40, which springs are connected to the bracket 31 by an eyelet 41, and to the lower end of the yoke 32 by an eyelet 42, as best seen in Fig. 2 of the drawings. Thus, during a relatively short portion of the rotation of the shaft 33, the tables 28 and parts connected therewith are lifted, and the pins 35 bear on the low levels 38 of the cam disks 36. This corresponds in point of time with the period when the drag bar 25, having engaged the severed stamps 22, moves from the stations of the cups 23 to the stations shown by dotted lines in Fig. 1 of the drawings, resulting in the disposition of the stamps 22 across the wells above mentioned.

The operation of the rises 39 is so timed that the tables 28 are disposed below said stamps, to be there held for the support of said stamps during the period when the boxes 9 are being fed by the plungers 16 above said wells and the stamps drawn thereover. When the boxes 9 are depressed, the tables 28 are correspondingly lowered by the opposite rise 39, until the pin 35 rides on the level 37. It is obvious that by thus supporting the stamps to prevent the same from sagging, perfect registration of the stamps and the boxes to which they are to be applied, is secured.

As set forth in the application above mentioned, the function of said rollers 43 and the plate 26 on which they are mounted is to overturn the loose ends of the stamps 22, and to press the same upon the upper surface of the box after the same rests on the floors 18 of the wells.

Below the plate 26 are plungers, the function of which is to advance the box 9 from the wells, for delivery through the runway 11 under the deck 12. The forward edges of the deck 12 overturn and press the free ends of the stamps 22 opposite that which is disposed of by the rollers 43 in the manner above described.

To permit the advance of the plungers above referred to, the tables 28 are each furnished with a slot 44, into which the standards supporting the plungers pass when moved forward to their advanced position. During this portion of the operation of the machine, the table 28 is held down by the pin 35 resting upon the level 37 of the disk 36. The table 28 remains in this position until said plungers are retracted and the drag bar 25 is again advanced to the position where it engages the severed stamps 22.

Claims:

1. A machine as characterized having, box-feeding and stamp-feeding tables disposed in parallel arrangement, and a runway for delivering stamped boxes, said runway having a floor at a level lower than said box and stamp-feeding tables, in combination with a receiving table for the boxes and stamps delivered from said tables; a mechanism for feeding boxes to said receiving table; a mechanism for feeding stamps to said receiving table; and means for elevating the said receiving table to the level of said box and stamp-feeding tables, said means operating in timed relation to said feeding mechanism.

2. A machine as characterized having, box-feeding and stamp-feeding tables in parallel arrangement, and a runway for delivering stamped boxes, said runway having a floor at a level lower than said box and stamp-feeding tables, in combination with a receiving table for said stamps and boxes; and an operating mechanism for said table, embodying a supporting spindle for said table, a yoke at the end of said spindle for engaging a driving shaft operatively connected with said feeding mechanism; a pin laterally extended from said yoke; and a cam disk mounted upon said shaft to bear upon said pin and to pivot upon said spindle and table connected therewith.

3. A machine as characterized having, box-feeding and stamp-feeding tables disposed in parallel arrangement, and a runway for delivering stamped boxes, said runway having a floor at a level lower than said boxes and stamp-feeding tables, in combination with a receiving table for said stamps and boxes; and an operating mechanism for said table, embodying a supporting spindle for said table, a yoke at the end of said spindle for engaging a driving shaft operatively connected with said feeding mechanism, a pin laterally extended from said yoke, a cam disk mounted on said shaft to bear upon said pin and to operate upon said spindle and table connected therewith, and yielding means for maintaining said pin in bearing relation to said disk.

4. A machine as characterized having, box-feeding and stamp-feeding tables disposed in parallel arrangement, and a runway for delivering stamped boxes, said runway having a floor at a lower level than said box and stamp-feeding tables, in combination with a receiving table for said stamps and boxes; and an operating mechanism for said table embodying a supporting spindle for said table, a yoke at the end of said spindle for engaging a driving shaft operatively connected with said feeding mechanism, a pin laterally extended from said yoke, a cam disk mounted on said shaft to bear upon said pin for operating upon said spindle and table connected therewith, and coiled springs connected for suspending said spindle and table connected therewith for maintaining the same in bearing relation to said disk.

In testimony whereof I have signed my name to this specification in the presence of two subscribing witnesses.

JOSÉ IBARRA.

Witnesses:
 LUIS F. DE ALMAQUE,
 RAOUL F. WASHINGTON.

Copies of this patent may be obtained for five cents each, by addressing the "Commissioner of Patents. Washington, D. C."